United States Patent [19]

Nozaki et al.

[11] Patent Number: 5,056,438
[45] Date of Patent: Oct. 15, 1991

[54] DETECTION SYSTEM FOR CONVEYER SYSTEM WHICH UTILIZES CONVEYOR DRIVE TO ROTATE IDENTIFYING CODE WHEEL

[75] Inventors: Yoshihisa Nozaki, Toyokawa; Takashi Inden, Nagoya, both of Japan

[73] Assignee: Brother Kogyo Kabushiki Kaisa, Nagoya, Japan

[21] Appl. No.: 558,763

[22] Filed: Jul. 26, 1990

[30] Foreign Application Priority Data

Jul. 27, 1989 [JP] Japan .................... 1-196362

[51] Int. Cl.⁵ .................. B61K 7/00; B65G 29/00; B65G 47/84
[52] U.S. Cl. .................................. 104/88; 104/172.4; 104/252; 198/352; 198/349; 198/465.4
[58] Field of Search ............... 104/88, 91, 172.4, 250, 104/252; 105/150; 198/351, 352, 349, 465.4

[56] References Cited

U.S. PATENT DOCUMENTS

| | | | |
|---|---|---|---|
| 3,285,195 | 11/1966 | Babson | 104/252 |
| 3,304,412 | 2/1967 | Rabinow | 104/88 X |
| 3,502,866 | 3/1970 | Biaggini | 104/88 X |
| 3,592,141 | 7/1971 | Davison | 104/88 |
| 4,719,449 | 1/1988 | Cousseau | 340/347 P |
| 4,726,462 | 2/1988 | Gruber | 104/88 X |

FOREIGN PATENT DOCUMENTS 2121366 12/1983 United Kingdom .
2106465 9/1984 United Kingdom .

Primary Examiner—Robert J. Oberleitner
Assistant Examiner—S. Joseph Morano
Attorney, Agent, or Firm—Kane, Dalsimer, Sullivan, Kurucz, Levy, Eisele and Richard

[57] ABSTRACT

A detection system provided in a conveyor system in which carrier members are conveyed by conveying member between work stations, having an identification code provided on a disk member on each carrier member for indicating the working station to which the carrier member is to be transferred, detector for reading the identification code, a stopper for holding the carrier member at a predetermined position, and transmitting member provided with the carrier member for being relatively moved to the carrier member and transmitting the conveying force of the conveying member to the identifying member only when the carrier member is held at the predetermined position.

19 Claims, 3 Drawing Sheets

DETECTION SYSTEM FOR CONVEYER SYSTEM WHICH UTILIZES CONVEYOR DRIVE TO ROTATE IDENTIFYING CODE WHEEL

BACKGROUND OF THE INVENTION

The present invention relates to a detection system equipped with a hanger conveyer system, in which hanger carrying workpieces are conveyed among working stations, for detecting a station to which the hanger is to be transferred.

Conventionally, as this type of hanger detection device, for example, a structure disclosed in U.S. Pat. No. 4,726,462 has been known. In such a conventional structure, a hanger with a conveying roller is supported on a rail so as to be transferred on the rail. The conveying roller has a code mark for identifying the hanger thereon. Further, at a particular position of the hanger conveying path, a detector and a drive drum which is driven by a motor are provided. When the hanger is stopped by a stopper or the like at a position opposed to the detector, the conveying roller is engaged with the drive drum. At that time, the conveying roller is idly rotated and the code mark on the conveying roller is read by the detector.

In the prior art described above, however, since the drive roller and the motor for idly rotating the conveying roller should be provided in the vicinity of the detector, the structure becomes complicated. In a mass-production system consisting of a large number of production steps such as a total sewing system, the hanger should be directed to various sewing stations. In such a system, when the conventional structure described above is employed, a large number of detectors, drive rollers, and motors should be provided according to the positions for directing the hangers to their destinations thereby the structure of the system becomes further complicated.

SUMMARY OF THE INVENTION

It is therefore an object of the invention to provide an improved hanger detection device equipped with a hanger conveyer system which is simple in the structure without additionally providing a drive means for rotating a detected member.

For the above objects, according to the invention, there is provided a detection system provided in a conveyer system in which carrier members carrying workpieces are conveyed by conveying means between working stations, said conveying means being continuously fed in a predetermine direction, said detection system comprising:

identifying means movably supported on each of said carrier members for identifying said carrier member;

holding means for holding the carrier member at a predetermined position of said conveying means;

transmitting means provided with said carrier member for transmitting the conveying force of said conveying means to said identifying means only when said carrier member is held by said holding means, whereby said identifying means is moved at said predetermined position; and detecting means for detecting said identifying means at said predetermined position when said identifying means is moved with respect to said carrier member.

In the hanger detection device described above, when the hanger as a carrier member is conveyed by the conveying means to a working station, the hanger is engaged with the holding means and stops. While the hanger stops, the identification member is rotated by the conveying means relatively fed against the hanger. According to the rotation of the identification member, the code mark on the identification member for identifying the hanger is read by the detecting member.

DESCRIPTION OF THE ACCOMPANYING DRAWINGS

DESCRIPTION OF THE EMBODIMENTS

Figure 1:
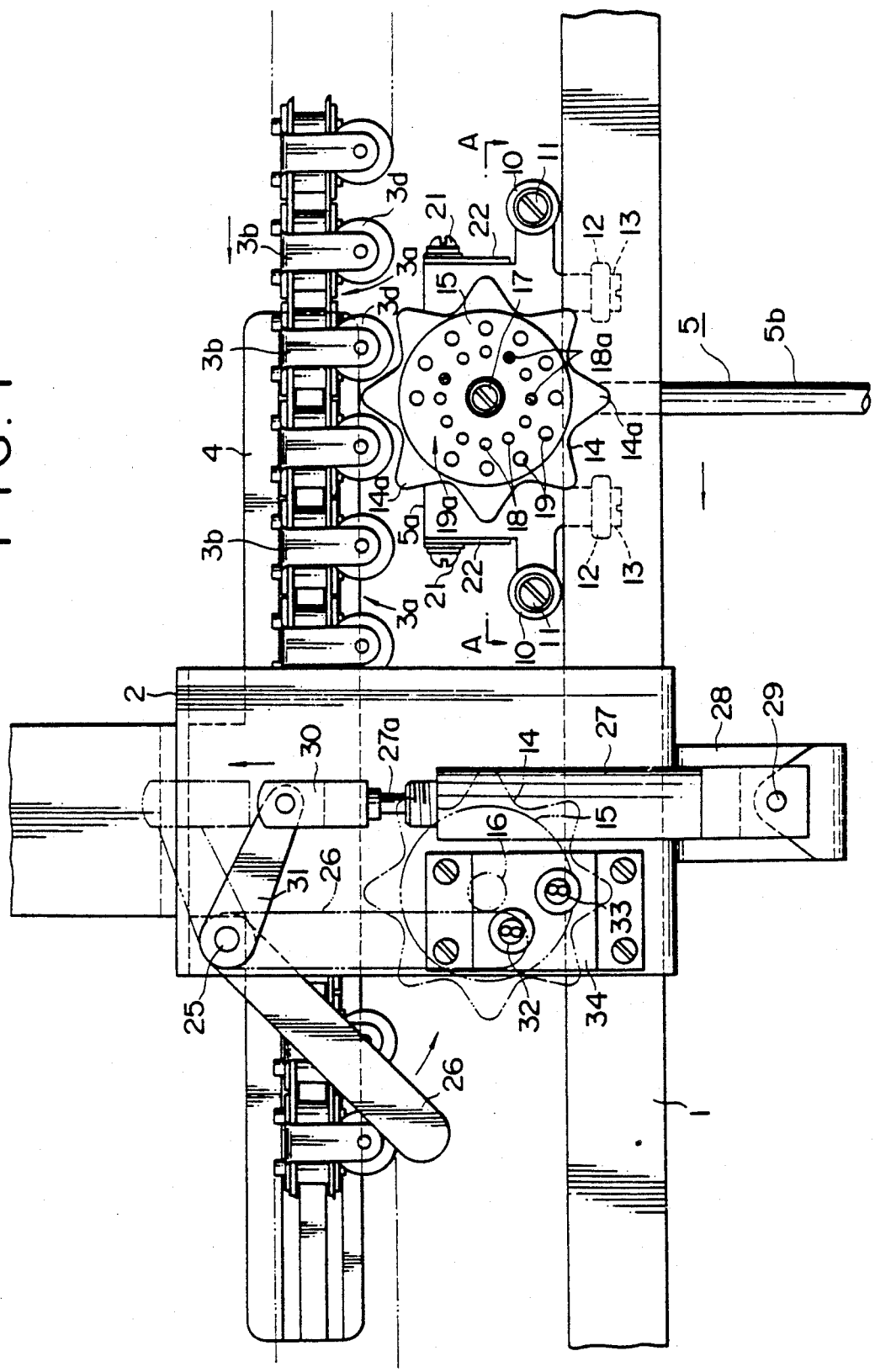
FIG. 1 is a partial top view showing a hanger conveyer system in which a detection system embodying the present invention is employed.

A pair of rails 1 are supported by a supporting frame 2 with a predetermined distance being kept therebetween in a sewing plant and the like. A chain 3 as a conveying member is extended over the pair of rails 1 by a chain guide 4 fixed to the supporting frame 2, a large number of engaging concave portions 3a being formed at a predetermined pitch on the lower side of the chain 3 in the lengthwise direction thereof. Chain links 3b and 3c secured to upper and down surface of chain 3 are bent downwardly, and a rollers 3d are held between respective pairs of chain link 3b and chain link 3c, the engaging concave portions 3a are formed between the rollers 3d. The chain 3 is fed by a well-known mechanism such as a drive means consisting of a motor, sprocket, and so forth (which are not shown) along the rails 1 in the direction indicated by an arrow in FIG. 1.

A hanger 5 for hanging a workpiece such as a sewing product is provided with a main body 5a movably supported on the pair of rails 1 and a hanging rod 5b extending downwardly from the lower surface of the main body 5a. A supporting shaft 6 is rotatably supported by the main body 5a through a pair of bearings 7, the supporting shaft 6 being horizontally disposed perpendicular to the direction where the rails 1 extend. A pair of rotating rollers 8, 8 are supported by a bearing 9 at both side of the supporting shaft 6 with nipping the main body 5a therebetween. So that the rotating rollers 8, 8 can be relatively rotated. The rotating rollers 8, 8 are rotatably supported on the rails 1.

A pair of front and rear first auxiliary rollers 10 are rotatably supported by extruded portions at the front end and the rear end of the main body 5a of the hanger 5 by means of shouldered screws 11, respectively. When each first auxiliary roller 10 is engaged with the upper surface of the rails 1, the deviation from the conveying direction of the hanger 5 is restricted and the position thereof in the conveying direction is kept. Further, with the extruded portions at the front end and the rear end of the main body 5a of the hanger 5, a certain distance between the two hangers 5 being prevented from approaching too close. A pair of front and rear second auxiliary rollers 12 are rotatably supported on the lower end of the main body 5a of the hanger 5 by means of shouldered screws 13. When each second auxiliary roller 12 is engaged with the inner surface of each rail 1, the deviation in the direction perpendicular to the conveying direction of the hanger 5 is restricted and the position thereof is kept in the direction.

A pair of sprocket-wheel-shaped drive transmission members 14 are engaged with both ends of the supporting shaft 6. A plurality of engagement extrusions (teeth) 14a are provided on the outer peripheries of respective transmission members 14, the extrusions 14a being engaged with the concave portions 3a formed by rollers 3d, the extrusions 14a being arranged to have same pitches as the engaging concave portions 3a. A pair of disk shaped identification members 15 are fixed on both ends of the supporting shaft 6 through collars 16 by means of screws 17, respectively. A plurality of first small holes 18 are formed on each of the identification members 15 on a certain circle at same pitches thereof, predetermined ones of the first small holes 18 being blocked to form a code mark 18a for identifying the hanger 5. A plurality of second small holes 19 for generating a reference pulse are formed on the same periphery of the identification members 15 at the same pitches, the second small holes 19 being formed on a larger circle than the circle on which the first small holes 18 are formed, part of the larger circle on which the second small holes 19 are formed being made unformed portion 19a where no holes are formed for postion detection.

An accommodation hole 20 is formed in the main body 5a of the hanger 5 therethrough in the horizontal direction perpendicular to the supporting shaft 6, both ends of the accommodation hole 20 being blocked with cover plates 22 mounted on the front and rear of the main body 5a by means of screws 21. A pair of frictional members 23 are rockably supported in the accommodation hole 20 and tensioned to the surface of the outer periphery of the supporting shaft 6 by the tension force of each spring 24 provided between the cover plate 22 and the frictional member 23. By means of the frictional member 23 which is in contact with the supporting shaft 6, the rotation of each drive transmission member 14 is restricted. The feeding force of the chain 3 is transferred to the hanger 5 through the drive transmission member 14 which is not rotated. When the transportation of the hanger 5 is prevented by stop levers 26 (described later), only the chain 3 is continuously fed and thereby a relative movement occurs between the chain 3 and the hanger 5. Thus, by the feeding force of the chain 3, the drive transmission members 14 are rotated against the pressure of the frictional members 23 and the identification members 15 are rotated therewith.

A rotating shaft 25 is rotatably supported on the supporting frame 2 at a predetermined position of the conveying path of the hanger 5. A pair of stop levers 26 structuring a stop means which comprising the supporting shaft 6, the frictional members 23, the springs 24, and so forth are fixed on both ends of the rotating shaft 25, one end of each stop lever 26 being able to be engaged with the collar 16 of the hanger 5. The lower end of an air cylinder 27 is rotatably mounted on the outer surface of the supporting frame 2 by means of a mounting plate 28 and a pin 29. When a piston rod 27a of the air cylinder 27 is extruded, the rotating shaft 25 is rotated counterclockwise in FIG. 1 through a joint member 30 and a rotating arm 31 and thereby each stop lever 26 is rotated from the non-engagement position shown by a solid line in FIG. 1 to the engagement position shown by a two-doted line of the figure. When the hanger 5 is conveyed along the rails 1 by the chain 3 with the stop levers 26 being located in the engagement position, the collars 16 are engaged with the respective stop levers 26 and the transportation of the hanger 5 is prevented.

Non-contact type first detecting member 32 and second detecting member 33 are mounted on the outer surface of the supporting frame 2 by means of a mounting plate 34 in the vicinity of the stop lever 26. Transparent openings 35, 35 are formed on the side plate of the supporting frame 2 corresponding to the ends of the first and second detecting members 32, 33, respectively. When the stop levers 26 prevents the transportation of the hanger 5 on the rails 1 and the identification members 15 are rotated by the drive transmission members 14 which is driven by the feeding force of the chain 3, the code marks 18a for identifying the hanger on the identification members 15 are optically read by the first detecting member 32 and the second small holes 19 on the identification members 15 for generating the reference pulse are optically read by the second detecting member 33.

Figure 2:
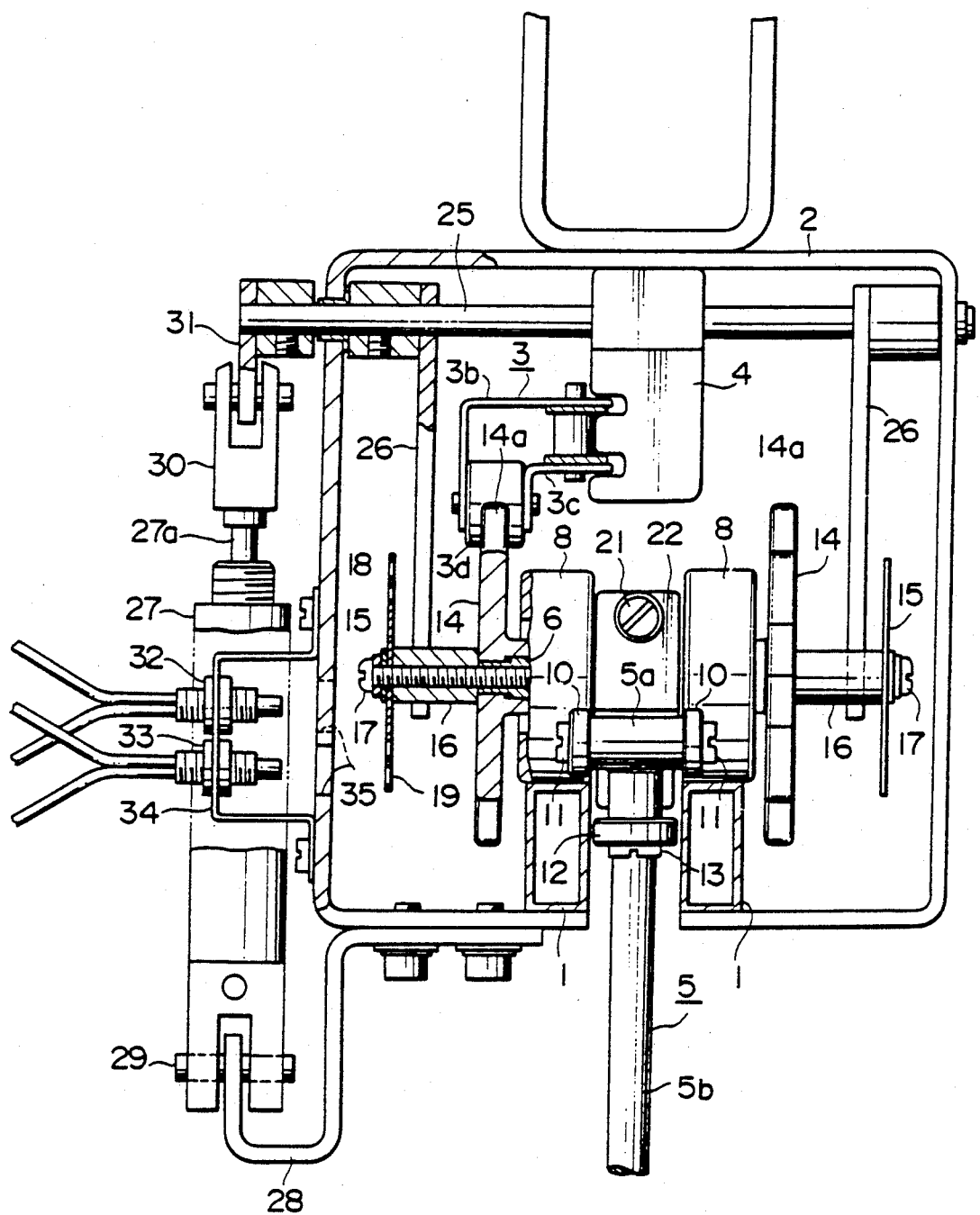
FIG. 2 is an sectional side view of the hanger conveyer system.
Figure 3:
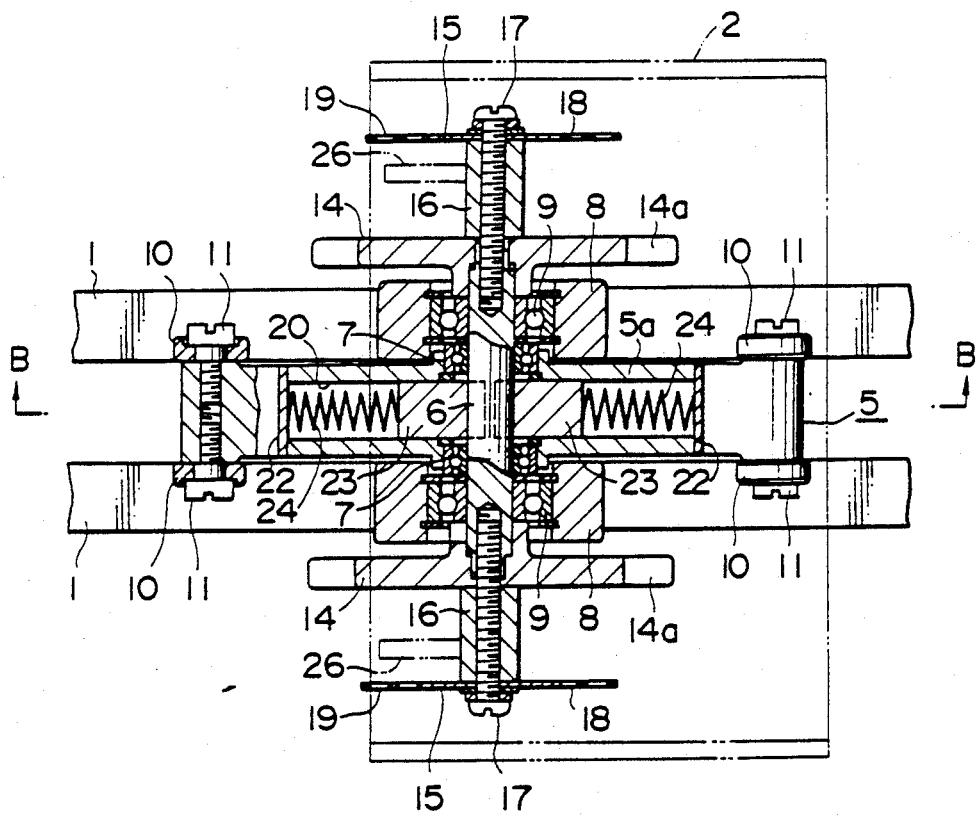
FIG. 3 is a sectional view taken from line A—A of FIG. 1.
Figure 4:
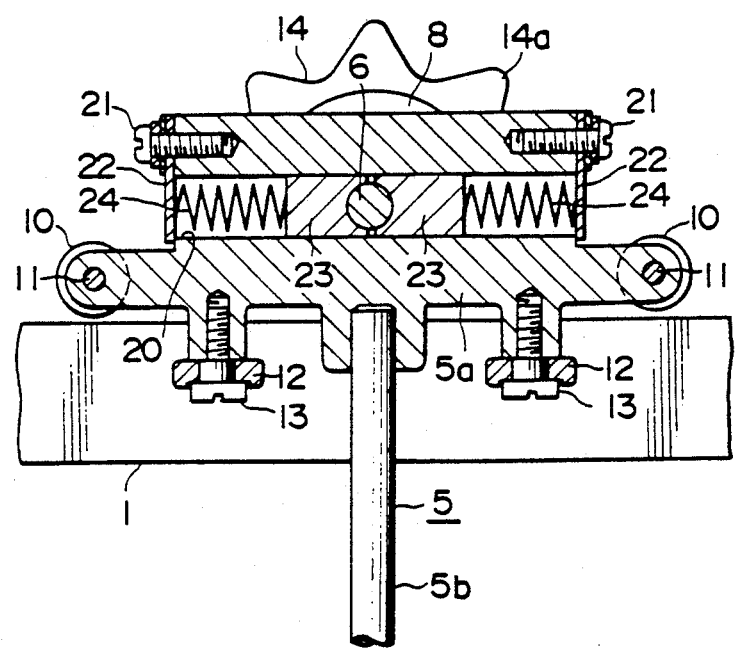
FIG. 4 is a sectional view taken from line B—B of FIG. 3.

It should be noted that the drive transmission members 14 and detected members 15 are provided on both of left and right sides of the hanger 5 so as to deal with a case where the first detecting member 32 and the second detecting member 33 are disposed oppositely on the left and right sides of FIG. 2.

Now, the operation of the hanger conveyer system in the structure described above will be explained.

In the hanger conveyer system, the engagement extrusions 14a of the drive transmission members 14 disposed on the main body 5a of the hanger 5 are engaged with the rollers 3d which form the engaging concave portions 3a so as to prevent the drive transmission member 14 from being slipped from the chain 3. Further, the frictional members 23 are tensioned to the supporting shaft 6 by tension force of the springs 24 so as to restrict the rotation of the drive transmission members 14. Thus, when the chain 3 is fed in the arrow direction of FIG. 1, the feeding force of the chain 3 is neutrally transferred to the hanger 5 through the drive transmission members 14 which are not rotating. Thus, the hanger 5 which hangs a workpiece such as a sewing product is conveyed along the rails 1 and the rotating rollers 8 rotates on the rails 1.

When the piston rod 27a of the air cylinder 27 is extruded, the rotating shaft 25 is rotated counterclockwise in FIG. 1 through the joint member 30 and the rotating arm 31, thereby the stop levers 26 is rotated from the non-engagement position shown by the solid line of FIG. 1 to the engagement position shown by the two-doted line of the figure. Thus, the collars 16 on the hanger 5 which is conveyed are engaged with the stop levers 26 and thereby the transportation of the hanger 5 is prevented. In this case, since the chain 3 is still being fed, if the hanger 5 stops, the drive transmission members 14 are rotated counterclockwise in FIG. 1 against the tension force of the frictional members 23 with the traveling force of the chain 3 and the identification members 15 are rotated in the same direction.

While the identification members 15 are being rotated, the second small holes 19 on the identification members 15 for generating a reference pulse are optically read by the second detecting member 33 disposed at the detection position and the first small holes 18 on the detected members 15 for identifying the hanger are optically read and the bit structure for identifying the hanger is obtained.

After the hanger is identified, the piston rod of the air cylinder 27 is inserted, the stop levers 26 being upwardly rotated, the hanger 5 being conveyed in a predetermined direction.

In the hanger detection device of the hanger conveyer system embodying to the present invention, while transportation of the hanger 5 is prevented by the stop levers 26, and the identification members 15 are rotated relative to the hanger 5 with the drive transmission members 14 by means of the chain 3, which is being continuously fed, no extra drive unit for rotating the identification members 15 is required. Thus, the drive structure of the identification members 15 can be simplified. Moreover, according to this invention, in a mass-production system consisting of a large number of working steps such as in a total sewing system, even if hangers are transferred to various working stations, it is not necessary to provide a large number of drive rollers and motors corresponding to the detectors at the branch positions where the conveying course of the hangers are changed, thereby the structure of the system can be simplified.

In the present invention, since the code marks 18a for identifying the hanger, and the second small holes 19 for generating a timing pulse are optically read by means of the first detecting member 32 and the second detecting member 33, respectively, the code marks 18a and second small holes 19 being formed on the identification members 15. These detections can be performed by conventional simple-structured. inexpensive reflection type sensors and the like. In addition, the code marks are read not by mechanical contacts but by optical device, the detection section is free from being damaged. It is also possible to provide a bar code at part of a hanger. However, in this case, it is necessary to use an expensive unit for radiating a laser beam as a read unit.

The present invention is not limited to the structure described in the embodiment above. For example, the identification members 15 may be incorporated with the drive transmission members 14. Moreover, it is possible to directly disposed the first small holes 18 and the second small holes 19 on the drive transmission members 14. Furthermore, the chain 3 may be replaced with a timing belt or the like. In addition, the detecting member may be formed by a magnetic sensor where the identification member is provided with a plurality of permanent magnets. It will be readily apparent to the one skilled in the art that various modifications may be made and other embodiments implemented without departing from the scope of the inventive concept.

Since the present invention is structured as described above, it is not necessary to provide an extra drive unit for rotating an identification member. That is, the identification member can be rotated by means of a feeding force of the feeding member for conveying the hanger and thereby the drive mechanism of the identification member can be relatively simplified.

What is claimed is:

1. A detection system provided in a conveyer system in which carrier members carrying workpieces are conveyed by conveying means between working stations, said conveying means being continuously fed in a predetermine direction, said detection system comprising:
   identifying means movably supported on each of said carrier members for identifying said carrier member;
   holding means for holding the carrier member at a predetermined position of said conveying means;
   transmitting means provided with said carrier member for transmitting the conveying force of said conveying means to said identifying means only when said carrier member is held by said holding means, whereby said identifying means is moved at said predetermined position; and
   detecting means for detecting said identifying means at said predetermined position when said identifying means is moved with respect to said carrier member.

2. The detection system according to claim 1, wherein said identifying means comprises a plate member having code indicating means.

3. The detection system according to claim 2, wherein said plate member comprises a disk member rotatably supported on said carrier member, and wherein said code indicating means has a plurality of holes on said disk member, said plurality of holes being detected by said detecting means when said disk member is rotated.

4. The detection system according to claim 3, wherein said holes are arranged on a first circle and a second circle, said second circle having larger diameter than said first circle.

5. The detection system according to claim 4, wherein said holes on said first circle are arranged by the same pitch, predetermined ones of said holes on said first circle being blocked.

6. The detection system according to claim 5, wherein said holes on said second circle are arranged by the same pitch, and wherein a certain portion of said second circle are formed with a non-hole portion for indicating the standard position of said disk member.

7. The detection system according to claim 6, wherein said detecting means comprises sensor means for sequentially detecting said plurality of holes.

8. The detection system according to claim 7, wherein said sensor means comprises a pair of optical sensors for optically detecting the arrangement of the holes provided on said first and second circles, respectively.

9. The detection system according to claim 1, wherein said holding means comprises a lever member pivoted to be moved between a first and a second position, said carrier member having been conveyed by said conveying means is engaged with said lever member when said lever member is located at said second position whereby the conveyance of said carrier member is prevented.

10. The detection system according to claim 9, wherein said carrier member is disengaged from said lever member when said lever member is located at said first position.

11. The detection system according to claim 10, wherein said holding means comprises lever drive means for driving said lever member.

12. The detection system according to claim 11, wherein said lever drive means comprises an air cylinder member containing a piston member connected with one end of said lever member, said piston member being reciprocally driven by charging and discharging air in said air cylinder member.

13. The detection system according to claim 3, wherein said transmitting means comprises a rotatable member for being rotated to rotate said disk member when said carrier member is held at said predetermined position, said rotatable member being rotated by the engagement of said rotatable member with said conveying means.

14. The detection system according to claim 13, wherein said transmitting means comprises friction means for restricting the rotational force which is applied to said rotatable member to rotate said rotatable member, whereby rotation of said rotatable member is prevented when said carrier member is being conveyed by said conveying means.

15. The detection system according to claim 14, wherein said transmitting means comprises a shaft member extending in a direction perpendicular to the direction where said carrier member is conveyed, said rotatable member and said disk member being fitted with said shaft member, and wherein said friction means comprises a plurality of biasing members which are neutrally biassed to contact said shaft member for restricting the rotation of said shaft member with frictional force between said biasing members and said shaft members.

16. The detection system according to claim 15, wherein rotation of said shaft member is prevented by said biasing members with the frictional force thereof when said carrier member is conveyed by said conveying means, while said shaft member is rotated against the frictional force of said biasing members when said carrier member is held by said holding means.

17. The detection system according to claim 16, wherein said conveying means comprises a chain member having a plurality of concave portions, said concave portions being arranged with predetermined pitches, and wherein said rotatable member comprises a sprocket-wheel-shaped member having a plurality of extrusions on the periphery thereof, said extrusions of said sprocket-wheel-shaped member being engaged with said concave portions of said chain member.

18. A detection system comprising a rail, a feeding member being fed along said rail, a hanger movably supported along said rail for carrying a workpiece, said hanger being engaged with said feeding member to be conveyed on said rail, said detection system further comprises:

stopper means to be engaged by said hanger for causing relative movement between said hanger and said feeding means to stop said hanger on said rail;

an identifying member rotatably supported on said hanger, said identifying member being rotated by said feeding means which is moved with respect to said hanger when said hanger is stopped;

a code mark provided on said identifying member for use of identifying said hanger; and detecting means arranged adjacent to said stopper means for detecting said code mark provided on said identifying member when said hanger is stopped and said identifying member is rotated.

19. A detection system for identifying a hanger carrying a workpiece comprising:

a rail;

a roller for movably supporting said hanger on said rail;

a feeding member provided and continuously fed along said rail, a plurality of concave portions being formed on said feeding member with a predetermined pitch;

a transmitting member rotatably supported on said hanger, said transmitting member having a plurality of extrusions to be engaged with said concave portions of said feeding member;

identifying means rotatably supported on said hanger for carrying identifying data of said hanger, said identifying means being rotated when said transmitting member is rotated; and friction means for restricting rotation of said transmitting member, said friction means neutrally restricting rotation of said transmitting means and transmitting the feeding force to said hanger to convey said hanger along said rail, said friction means permitting rotation of said transmitting member when the conveyance of said hanger is prevented; and detecting means for detecting said identifying means to obtain said identifying data when said transmitting member is rotated with the engagement between said extrusions of said transmitting member and said concave portions of said feeding member.

* * * * *